United States Patent
Mallik et al.

(10) Patent No.: US 11,734,655 B2
(45) Date of Patent: Aug. 22, 2023

(54) METHOD AND SYSTEM FOR A FAILSAFE MECHANISM FOR BLOCKCHAIN WALLETS

(71) Applicant: MASTERCARD INTERNATIONAL INCORPORATED, Purchase, NY (US)

(72) Inventors: Aishwarya Mallik, Bihar (IN); Alok Kumar Dwivedi, Gorakhpur (IN); Chandan Garg, Punjab (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 272 days.

(21) Appl. No.: 16/250,431

(22) Filed: Jan. 17, 2019

(65) Prior Publication Data

US 2020/0234257 A1 Jul. 23, 2020

(51) Int. Cl.
*G06Q 20/06* (2012.01)
*G06Q 20/38* (2012.01)
*G06Q 20/40* (2012.01)

(52) U.S. Cl.
CPC ..... *G06Q 20/0658* (2013.01); *G06Q 20/0652* (2013.01); *G06Q 20/3825* (2013.01); *G06Q 20/3829* (2013.01); *G06Q 20/405* (2013.01)

(58) Field of Classification Search
CPC .......... G06Q 20/0658; G06Q 20/0652; G06Q 20/3825; G06Q 20/3829; G06Q 20/405
USPC .......................................................... 705/50
See application file for complete search history.

(56) References Cited

U.S. PATENT DOCUMENTS

| | | | |
|---|---|---|---|
| 10,790,976 B1* | 9/2020 | Raevsky | H04L 9/0891 |
| 2017/0046693 A1* | 2/2017 | Haldenby | G06F 21/62 |
| 2019/0245688 A1* | 8/2019 | Patin | H04L 9/0863 |
| 2019/0253239 A1* | 8/2019 | Shao | H04L 9/3239 |
| 2020/0005282 A1* | 1/2020 | Kim | H04L 9/0825 |
| 2020/0019936 A1* | 1/2020 | Irazabal | G06Q 20/3827 |
| 2020/0051069 A1* | 2/2020 | Wilson | H04L 63/12 |
| 2020/0089671 A1* | 3/2020 | Padmanabhan | G06Q 20/389 |
| 2020/0118094 A1* | 4/2020 | Haldenby | G06Q 20/065 |
| 2020/0119916 A1* | 4/2020 | Pickhardt | H04L 9/3236 |
| 2020/0195433 A1* | 6/2020 | Collier | H04L 9/0894 |
| 2020/0320519 A1* | 10/2020 | Asa | G06Q 20/02 |
| 2020/0374134 A1* | 11/2020 | Guo | H04L 9/3247 |

(Continued)

*Primary Examiner* — Courtney P Jones
(74) *Attorney, Agent, or Firm* — Panitch Schwarze Belisario & Nadel LLP

(57) ABSTRACT

A method for propagating survival of cryptographic currency after inactivity over a predetermined period of time in a blockchain through the use of smart contracts includes: receiving a propagation request that includes unspent transaction output addresses, a digital signature, and a recipient address; generating a smart contract that is configured to self-execute after a predetermined period of time to initiate transfer of cryptographic currency from the output addresses to the recipient address; submitting the smart contract to a node in a blockchain network for addition to the blockchain; monitoring for new blockchain transactions involving any of the unspent transaction output addresses; generating a new smart contract to update the unspent transaction output addresses based on new blockchain transactions; and submitting the new smart contract to a node in a blockchain network after updating.

16 Claims, 5 Drawing Sheets

(56) References Cited

U.S. PATENT DOCUMENTS

2021/0342838 A1* 11/2021 Hoggard ................. G06Q 20/26
2022/0198442 A1*  6/2022 Maeng ................. G06Q 20/227

* cited by examiner

METHOD AND SYSTEM FOR A FAILSAFE MECHANISM FOR BLOCKCHAIN WALLETS

FIELD

The present disclosure relates to propagating survival of cryptographic currency after inactivity, specifically the use of a specially configured smart contract to ensure cryptographic currency is not lost following a period of inactivity that may result from loss of a blockchain wallet private key.

BACKGROUND

The creation of the blockchain mechanism for storage gave rise to a number of cryptographic currencies that have been used throughout the world. Cryptographic currencies managed using a blockchain provide for a number of benefits, including decentralization and anonymity. When using a blockchain, cryptographic currencies are controlled by individual blockchain wallets, which is represented by a private key of a cryptographic key pair that grants the possessor control over all cryptographic currency tied to that private key. One of the side effects of the anonymity granted by using a blockchain is that there are no mechanisms for the recovery of a lost or stolen private key. As a result, there have been numerous stories of a private key that has been lost when a computer has been lost or hard drive has been erased, and with it millions of dollars' worth of cryptographic currency has become inaccessible.

Some methods have been developed to assist users with preventing loss of their private keys, and thus a loss of all of the cryptographic currency associated therewith. One method is for users to keep extra copies of their private key, such as on small, portable flash drives that can be stored in a safe place for later recovery should the need arise. However, this places the private key at a greater risk for theft, where theft of any of the copies of the private key can place their entire amount of cryptographic currency at risk for an instant transfer to the thief. Another method is that some services have been created that serve as repositories for private keys, where the entity may store a user's private key and perform the necessary actions for blockchain transactions on the user's behalf. However, many of these repositories have been hacked over recent years and the private keys stolen and funds compromised, and others have themselves fraudulently stolen cryptographic currency from their users.

Thus, there is a need for a technical solution that can enable a user to retain their cryptographic currency even if a loss of a private key occurs, and in particular a solution that has minimal risk for fraud or theft as compared to alternative solutions that have, thus far, been largely unsuccessful.

SUMMARY

The present disclosure provides a description of systems and methods for propagating survival of cryptographic currency over a predetermined period of time in a blockchain through the use of smart contracts. A user may have a blockchain wallet that they use as their primary wallet for transactions conducted using cryptographic currency, also referred to herein as "cryptocurrency," on a blockchain. To mitigate the risk of that blockchain wallet becoming lost, the user can create a second blockchain wallet where the cryptocurrency can be automatically transferred should the first blockchain wallet experience a period of inactivity. Whenever a new transaction is conducted using the primary blockchain wallet, a smart contract is created that will automatically transfer all unused currency tied to the primary wallet to the user's secondary wallet after a predetermined period of inactivity. This results in a "dead man's switch" that will enable the user, or another authorized party, such as a bank, trust, friend, relative, lawyer, etc., to retain ownership of the cryptocurrency should something happen to the primary wallet or the user. Each time a new transaction occurs, the smart contract is recreated and updated to account for the change in output addresses, ensuring that all currency is captured any time the smart contract needs to be executed. The result is that the user will be safe in the event that their private key gets lost and does not need to create copies of their private key or rely on untrustworthy repositories or storage services.

A method for propagating survival of cryptographic currency after inactivity over a predetermined period of time in a blockchain through the use of smart contracts includes: receiving, by a receiver of a processing server, a propagation request including at least one transaction output address, a digital signature, and a recipient address, where the recipient address and each of the at least one transaction output address are blockchain addresses associated with a blockchain, where each at least one transaction output address is generated using a public key of a cryptographic key pair, and where the digital signature is generated using a private key of the cryptographic key pair; generating, by a processing device of the processing server, a first smart contract, wherein the first smart contract is an executable script configured to self-execute after a predetermined period of time and initiate a first blockchain transaction for transfer of all assets from each of the at least one transaction output addresses to the recipient address including use of the digital signature; transmitting, by a transmitter of the processing server, the generated first smart contract to a blockchain node of a plurality of blockchain nodes associated with the blockchain; receiving, by the receiver of the processing server, a blockchain data value included in a new block added to the blockchain, wherein the blockchain data value includes one of: a used address of the at least one transaction output addresses and a new address generated using the public key of the cryptographic key pair, and wherein the blockchain data value was added to the blockchain within the predetermined period of time; generating, by the processing device of the processing server, a second smart contract, wherein the second smart contract is an executable script configured to self-execute after the predetermined period of time and initiate a second blockchain transaction for transfer of all assets from (i) each of the at least one transaction output addresses without the used address, or (ii) each of the at least one transaction output addresses and the new address, to the recipient address including use of the digital signature; and transmitting, by the transmitter of the processing server, the generated second smart contract to one of the plurality of blockchain nodes associated with the blockchain.

A system for propagating survival of cryptographic currency after inactivity over a predetermined period of time in a blockchain through the use of smart contracts includes: a receiver of a processing server configured to receive a propagation request including at least one transaction output address, a digital signature, and a recipient address, where the recipient address and each of the at least one transaction output address are blockchain addresses associated with a blockchain, where each at least one transaction output address is generated using a public key of a cryptographic key pair, and where the digital signature is generated using a private key of the cryptographic key pair; a processing device of the processing server configured to generate a first smart contract, wherein the first smart contract is an executable script configured to self-execute after a predetermined period of time and initiate a first blockchain transaction for transfer of all assets from each of the at least one transaction output addresses to the recipient address including use of the digital signature; and a transmitter of the processing server configured to transmit the generated first smart contract to a blockchain node of a plurality of blockchain nodes associated with the blockchain, wherein the receiver of the processing server is further configured to receive a blockchain data value included in a new block added to the blockchain, wherein the blockchain data value includes one of: a used address of the at least one transaction output addresses and a new address generated using the public key of the cryptographic key pair, and wherein the blockchain data value was added to the blockchain within the predetermined period of time, the processing device of the processing server is further configured to generate a second smart contract, wherein the second smart contract is an executable script configured to self-execute after the predetermined period of time and initiate a second blockchain transaction for transfer of all assets from (i) each of the at least one transaction output addresses without the used address, or (ii) each of the at least one transaction output addresses and the new address, to the recipient address including use of the digital signature, and the transmitter of the processing server is further configured to transmit the generated second smart contract to one of the plurality of blockchain nodes associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Propagating Cryptocurrency Survival Through Smart Contracts

Figure 1:
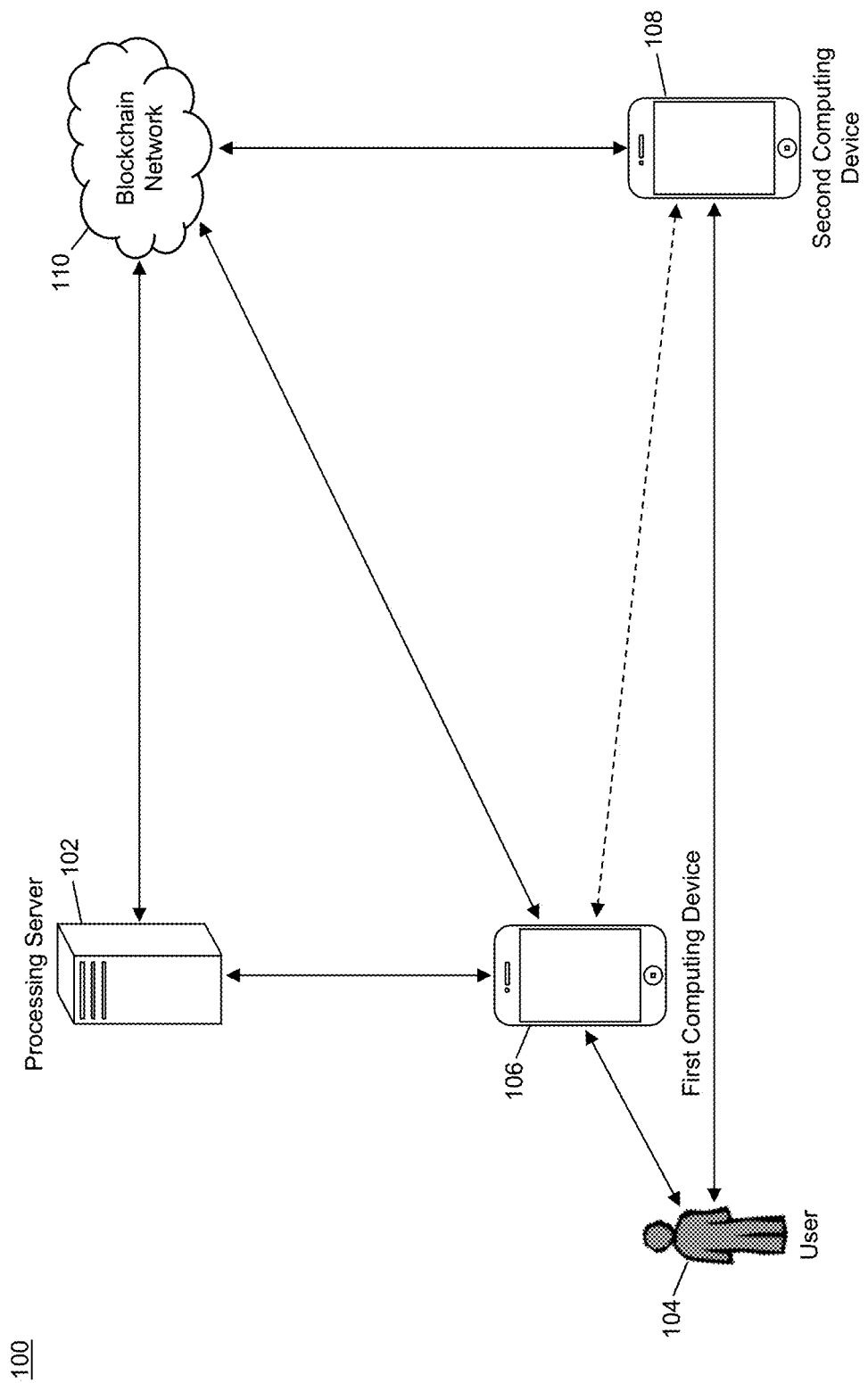
FIG. 1 is a block diagram illustrating a high level system architecture for propagating survival of cryptographic currency through the use of smart contracts in accordance with exemplary embodiments.

FIG. 1 illustrates a system 100 for propagating the survival of cryptographic currency that is tied to a blockchain wallet through the use of a dead man's switch accomplished via smart contracts that will transfer all cryptographic currency tied to the blockchain wallet to a secondary blockchain wallet following a predetermined period of inactivity.

The system 100 may include a processing server 102. The processing server 102, discussed in more detail below, may be configured to assist a user 104 with propagating the survival of their cryptographic currency in the event that they lose their primary blockchain wallet or something otherwise happens to the user 104 that leaves them unable to continue using their primary blockchain wallet, such as in the event of death or incapacity of the user 104. A blockchain wallet may be associated with a blockchain network 110 that is used to transmit and receive blockchain currency in electronic payment transactions conducted via the blockchain network 110. A blockchain wallet may be an application program that is executed by a computing device possessed by the user 104. As discussed herein, the user 104 may have a first computing device 106, which may store and be referred to herein as their "primary" blockchain wallet. The user 104 may also have or otherwise designate a second computing device 108, which may store and be referred to herein as the "secondary" or "recovery" blockchain wallet. In some cases, the second computing device 108 may be another computing device possessed by the user 104. In other cases, the second computing device 108 may be possessed by a trusted third party, such as a friend, relative, bank, trust, lawyer, etc. The first computing device 106 and second computing device 108 may be any type of computing device suitable for possessing and utilizing a blockchain wallet, such as a desktop computer, laptop computer, tablet computer, notebook computer, cellular phone, smart phone, smart watch, smart television, wearable computing device, implantable computing device, etc.

A blockchain wallet may include a private key of a cryptographic key pair that is used to generate digital signatures that serve as authorization by the user 104 for a blockchain transaction, where the digital signature can be verified by the blockchain network 110 using the public key of the cryptographic key pair. In some cases, the term "blockchain wallet" may refer specifically to the private key. In other cases, the term "blockchain wallet" may refer to the computing device that stores the private key for use thereof in blockchain transactions. In some embodiments, the first computing device 106 may be configured to perform the functions of the processing server 102 as discussed herein.

The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node in the blockchain network 110. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a blockchain transaction. A blockchain transaction may consist of at least: a digital signature of the sender of currency that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction. In some cases, a blockchain transaction may also include the sender's public key, for use by any entity in validating the transaction. For the processing of a blockchain transaction, such data may be provided to a node in the blockchain network 110, either by the sender or the recipient. The node may verify the digital signature and the sender's access to the funds, and then include the blockchain transaction in a new block. The new block may be validated by other nodes in the blockchain network 110 before being added to the blockchain and distributed to all of the nodes in the blockchain network 110.

In a standard blockchain transaction where the user 104 is a sender, the user 104 may generate a digital signature using the private key of their first computing device 106. The recipient may generate a blockchain address using its own public key, which may be provided to the first computing device 106. In some cases, the recipient may provide the first computing device 106 with its public key, where the first computing device 106 may generate the blockchain address. The first computing device 106 may then submit the required information to a node in the blockchain network 110 for processing. In some instances, the node may return a blockchain transaction identifier to the first computing device 106, which may be a value that is unique to that blockchain transaction for identification thereof. In such traditional transactions, the recipient is required to generate blockchain address or distribute its public key, and, in some cases, may be required to submit the transaction data directly to blockchain networks 110.

To ensure survival of the cryptocurrency possessed by the user 104, the user 104 may request that the processing server 102 set up a smart contract to retain possession of the cryptographic currency even if the first computing device 106 is lost. The user 104 may, using the first computing device 106, transmit a propagation request to the processing server 102 using a suitable communication network and method, such as via a web page, application program executed by the first computing device 106, etc. The propagation request may include at least a digital signature generated using the primary blockchain wallet's private key, a recipient address generated using the public key of the secondary blockchain wallet (the designated second computing device 108), and one or more transaction output addresses. Each of the transaction output addresses may be a blockchain address generated using the primary blockchain wallet's public key for the receipt of cryptographic currency in a prior blockchain transaction. In some cases, a digital signature may be generated by the primary blockchain wallet for each of the transaction output addresses, if necessary. In an exemplary embodiment, a blockchain wallet may be configured to maintain a list of all currently usable transaction output addresses and the amount of cryptographic currency associated therewith. In some cases, the propagation request may include the cryptocurrency amount associated with each of the transaction output addresses.

The processing server 102 may receive the propagation request and may generate a smart contract based thereon. The smart contract may be an executable script that is added to the blockchain by a node in the blockchain network 110 that is configured to self-execute after a predetermined period of time. The predetermined period of time may be set by the user 104 (e.g., in the propagation request), the processing server 102, or the blockchain network 110 itself. The smart contract may, when self-executing, initiate a new blockchain transaction for transfer of all of the cryptocurrency from each of the one or more transaction output addresses to the recipient address, with the digital signature included for validation by nodes in the blockchain network 110 to verify and confirm the transaction. This transaction may result in all cryptocurrency associated with the primary blockchain wallet being transferred to the recovery blockchain wallet after the period of inactivity, providing a dead man's switch so that the cryptocurrency can continue to be used even if the first computing device 106 is lost or the private key is otherwise rendered unusable.

The smart contract may be configured to expire if a new blockchain transaction is conducted using the first blockchain wallet ahead of the predetermined period of time. In some instances, the expiration may be accomplished by the smart contract stopping execution if a future smart contract is posted to the blockchain associated with the first blockchain wallet (e.g., identified by the digital signature, a public key, or other suitable method). In other instances, the smart contract may be configured to identify if any of the one or more transaction output addresses have been used in a later blockchain transaction, such that the use of any of the transaction output addresses may stop execution of the smart contract. In such an instance, any time a new transaction is conducted by the user 104 using the first computing device 106 after creation of the smart contract, that smart contract will no longer be able to execute.

In an exemplary embodiment, when a transaction output address included in a smart contract for propagation is used for a blockchain transaction, a new smart contract may be created. In some cases, the creation and submission of the new smart contract may be automatically performed by the processing server 102 or first computing device 106, as applicable. In some instances, the first computing device 106 may automatically submit a new propagation request to the processing server 102 each time a blockchain transaction is conducted using the primary blockchain wallet. The new smart contract may be similar to the initial smart contract, with new digital signatures, as applicable, where the transaction output addresses and any associated cryptocurrency amounts are updated based on the new blockchain transaction. For instance, if the user 104 is the sender in the new blockchain transaction, any output addresses used in the new blockchain transaction may be removed from the one or more transaction output addresses included in the smart contract. In instances where there is a remainder (e.g., change) kept by the primary blockchain wallet, a new output address to where that remainder is transferred may be included in the smart contract's transaction output addresses. If the user 104 is the recipient in a new blockchain transaction, the new address used to receive the cryptocurrency in the new blockchain transaction may be added to the transaction output addresses included in the new smart contract.

As a result, the blockchain will always include an up-to-date smart contract that will transfer all cryptocurrency that is controlled by the primary blockchain wallet to the secondary blockchain wallet following a period of inactivity. This enables the user 104 to transact freely without concern for loss of the first computing device 106, as their cryptocurrency may always be recovered using the second computing device 108. The user 104 can have the second computing device 108 kept in a safe place, such as with a trusted third party, in a safe deposit box, in a home safe, etc., and be sure that they will never lose their cryptocurrency, and that their cryptocurrency can be kept by a designated party if they die or are otherwise incapacitated. The use of smart contracts that are kept up-to-date automatically by the processing server 102 and/or first computing device 106 ensures that the propagation of the cryptocurrency can occur with little-to-no intervention by the user 104 after designation of the second computing device 108, thus providing the valuable service to the user 104 with great convenience and ease of use.

Processing Server

Figure 2:
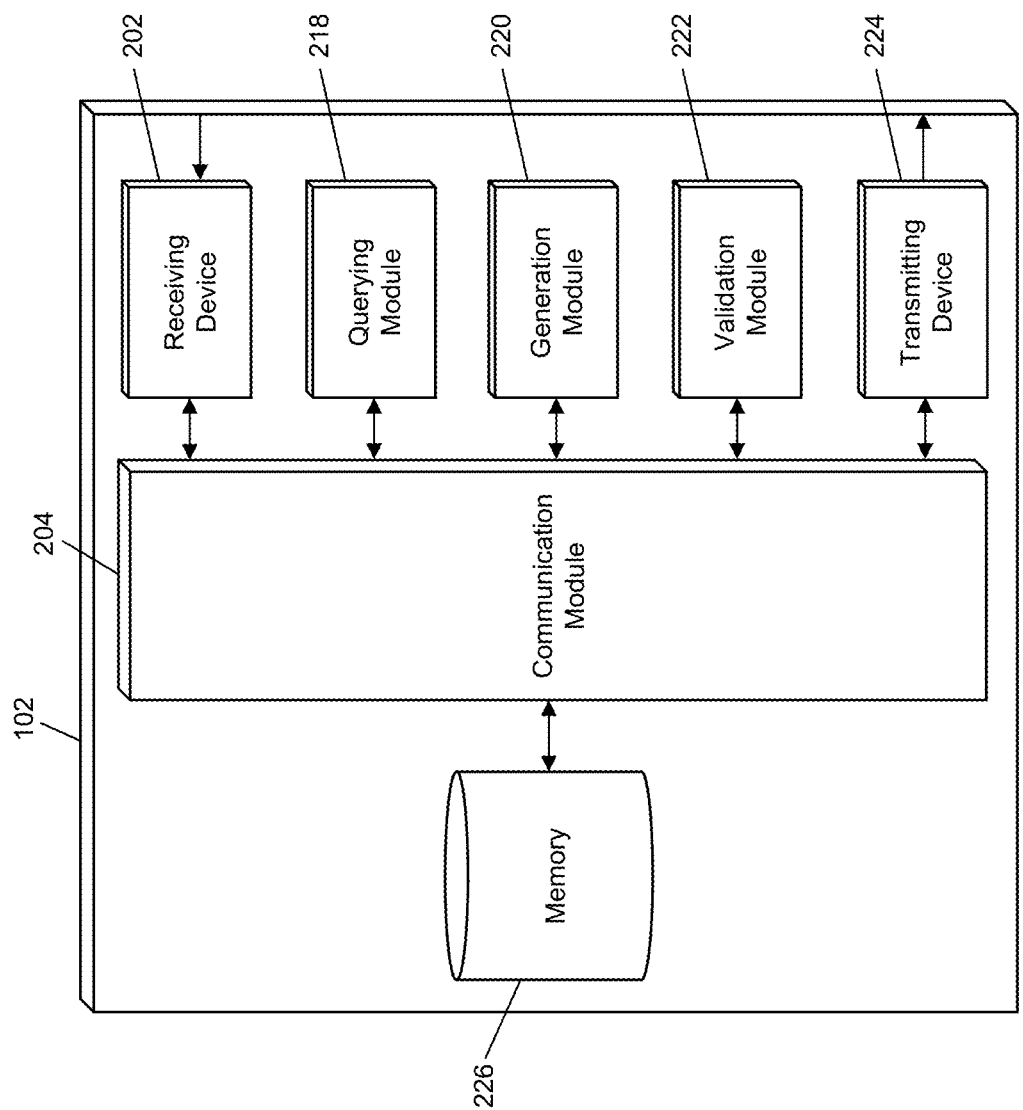
FIG. 2 is a block diagram illustrating the processing server of the system of FIG. 1 for propagating survival of cryptographic currency using smart contracts in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. It will be apparent to persons having skill in the relevant art that the functions of the processing server 102 discussed herein may be performed by the first computing device 106 and/or a node in the blockchain network 110 depending on implementation. For example, the primary blockchain wallet may be configured to generate its own smart contracts that are submitted to the blockchain following each blockchain transaction in which it is a participant.

The processing server 102 may include a receiving device 202. The receiving device 202 may be configured to receive data over one or more networks via one or more network protocols. In some instances, the receiving device 202 may be configured to receive data from first computing devices 106, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by first computing devices 106 that are superimposed or otherwise encoded with propagation requests. Propagation requests may include one or more digital signatures, a recipient address, and one or more transaction output addresses, where, in some cases, each transaction output address may have a cryptocurrency amount associated therewith. The receiving device 202 may also be configured to receive data signals electronically transmitted by nodes in the blockchain network 110, such as may be superimposed or otherwise encoded with notifications regarding the addition of submitted smart contracts to the blockchain, or notifications of new blockchain transactions, such as for use by the processing server 102 in monitoring for new blockchain transactions involving the first computing device 106 for automatic creation and submission of new smart contracts.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 218. The querying module 218 may be configured to execute queries on databases to identify information. The querying module 218 may receive one or more data values or query strings, and may execute a query string based thereon on an indicated database, such as a memory 226 of the processing server 102 to identify information stored therein. The querying module 218 may then output the identified information to an appropriate engine or module of the processing server 102 as necessary. The querying module 218 may, for example, execute a query on the memory 226 to identify information from prior propagation requests for the automatic generation of new smart contracts when a new blockchain transaction is processed involving the first computing device 106.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate smart contracts for the propagation of cryptocurrency after a predetermined period of inactivity for the primary blockchain wallet. The generation module 220 may also be configured to automatically generate new, updated smart contracts if requested by the user 104 that includes updated transaction output addresses when new blockchain transactions are conducted using the primary blockchain wallet.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, validate a digital signature received from the first computing device 106 using a public key of the primary blockchain wallet to ensure that the first computing device 106 is authorized to spend the transaction output addresses included in a propagation request. In some cases, a digital signature may be submitted for each transaction output address, where the validation module 222 may validate each of the digital signatures.

The processing server 102 may also include a transmitting device 224. The transmitting device 224 may be configured to transmit data over one or more networks via one or more network protocols. In some instances, the transmitting device 224 may be configured to transmit data to first computing devices 106, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to first computing devices 106 that are superimposed or otherwise encoded with requests for data (e.g., requesting updated or new digital signatures, transaction output addresses, permission for new smart contracts, etc.) or notifications (e.g., of smart contract submissions, etc.). The transmitting device 224 may also be configured to electronically transmit data signals to nodes in the blockchain network 110, which may be superimposed or otherwise encoded with smart contracts for confirmation and addition to the blockchain, where the smart contracts may be self-executable after a predetermined period of inactivity by the primary blockchain wallet.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices, public keys, key and signature generation algorithms, propagation requests, predetermined periods of time, automatic generation rules and preferences, etc.

Process for Propagation of Cryptocurrency

Figure 3:
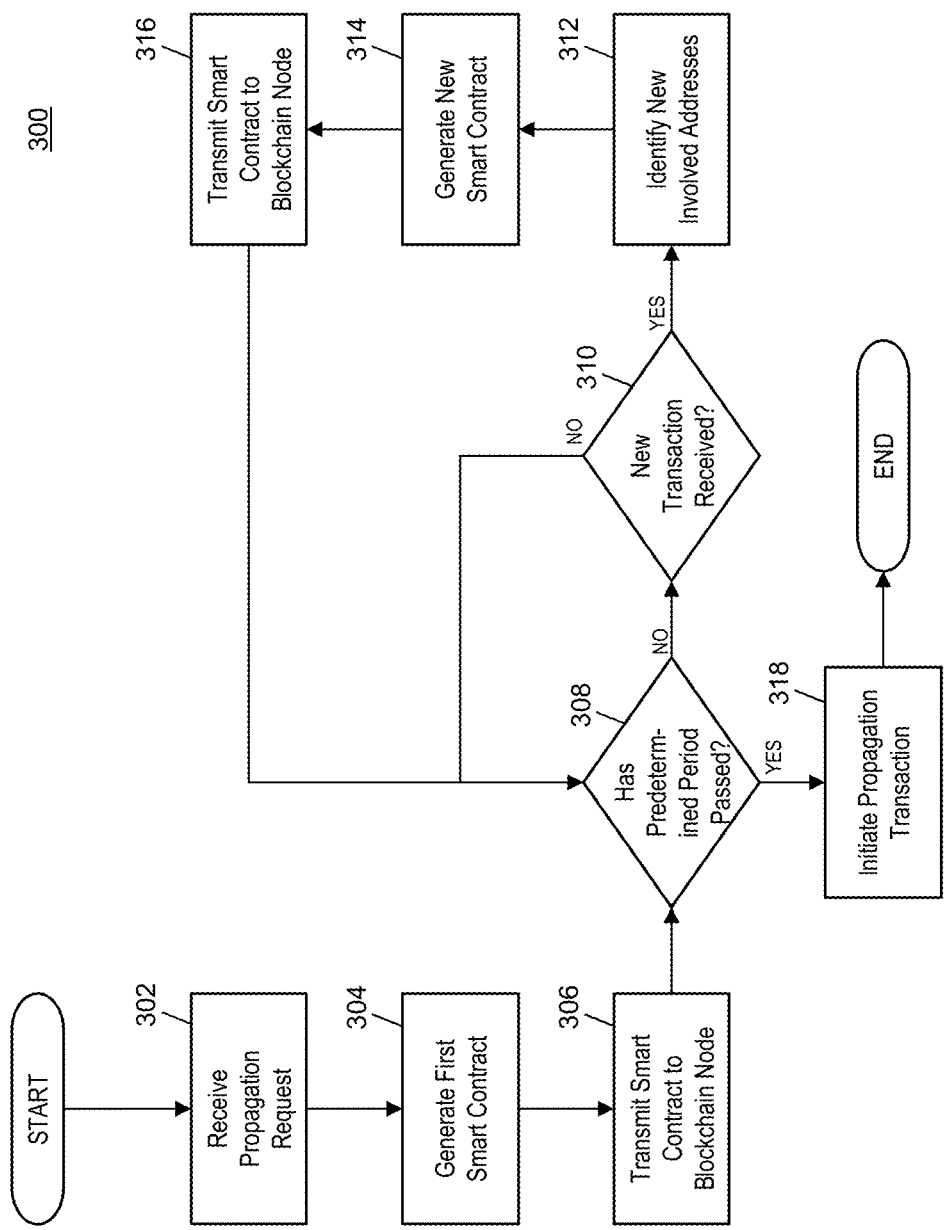
FIG. 3 is a flow diagram illustrating a process for the use smart contracts to propagate survival of cryptographic currency after a period of inactivity by the processing server of FIG. 2 in accordance with exemplary embodiments.

FIG. 3 illustrates an example process 300 executed by the processing server 102 of FIG. 2 for use in the system 100 of FIG. 1 for propagation the survival of cryptocurrency through the use of smart contracts.

In step 302, the receiving device 202 of the processing server 102 may receive a propagation request from a first computing device 106. The propagation request may include at least one or more digital signatures, a recipient address generated using the public key of the second computing device 108, and one or more transaction output addresses, each of which may be accompanied by a cryptocurrency amount associated therewith. In step 304, the generation module 220 of the processing server 102 may generate a first smart contract, where the smart contract is an executable script that is configured to self-execute after a predetermined period of time to initiate a transfer of the cryptocurrency amount from each of the transaction output addresses in the propagation request to the recipient address. In step 306, the transmitting device 224 of the processing server 102 may electronically transmit the smart contract to a node in the blockchain network 110 for confirmation and addition to the blockchain.

In step 308, the processing server 102 may check to see if the predetermined period of time included in the smart contract (e.g., set by the processing server 102 or specified by the user 104 in the propagation request) has passed. If the time has not yet passed, the processing server 102 may, at step 310, identify to see if a new blockchain transaction has been processed that involves the first computing device 106. Such a transaction may be identified by reviewing new blockchain transactions for inclusion of a transaction output address included in the smart contract or generated by the first computing device's public key, receiving a notification from the first computing device 106 of a new transaction, or receiving a notification from the blockchain network 110 of a new transaction involving the primary blockchain wallet. If no new transaction has been received at step 310, the process 300 may return to step 308 where the processing server 102 may continue to monitor for new transactions ahead of the expiration of the predetermined period of time.

If, at step 310, a new transaction has been processed that involves the first blockchain wallet, then, in step 312, the processing server 102 may identify new transaction output addresses that need to be included in a new smart contract. The new transaction output addresses may include any of the transaction output addresses from the first smart contract that were not used as well as any addresses generated using the first blockchain wallet's public key for the receipt of any cryptocurrency as a result of the new transaction, such as where the user 104 is a recipient or receives a remainder of cryptocurrency as a sender. In step 314, the generation module 220 of the processing server 102 may generate a new smart contract that is similar to the first smart contract, but with the changed transaction output addresses. In some cases, one or more new digital signatures may be required, which may be requested from and received from the first computing device 106, if applicable.

In step 316, the transmitting device 224 of the processing server 102 may electronically transmit the new smart contract to a node in the blockchain network 110 for confirmation and addition to the blockchain. The process 300 may then return to step 308 where the processing server 102 may continue to monitor for new blockchain transactions involving the primary blockchain wallet. If the predetermined period of time has passed without any blockchain transaction being processed that involves the primary blockchain wallet, then, in step 318, the smart contract may self-execute, which may result in all of the cryptocurrency associated with each of the transaction output addresses in the smart contract being transferred to the recipient address, which is associated with the second computing device 108. The recovery blockchain wallet may thus have possession of all of the cryptocurrency as a result of the expiration of the predetermined period of time due to the inactivity of the primary blockchain wallet.

Exemplary Method for Propagating Survival of Cryptographic Currency

Figure 4:
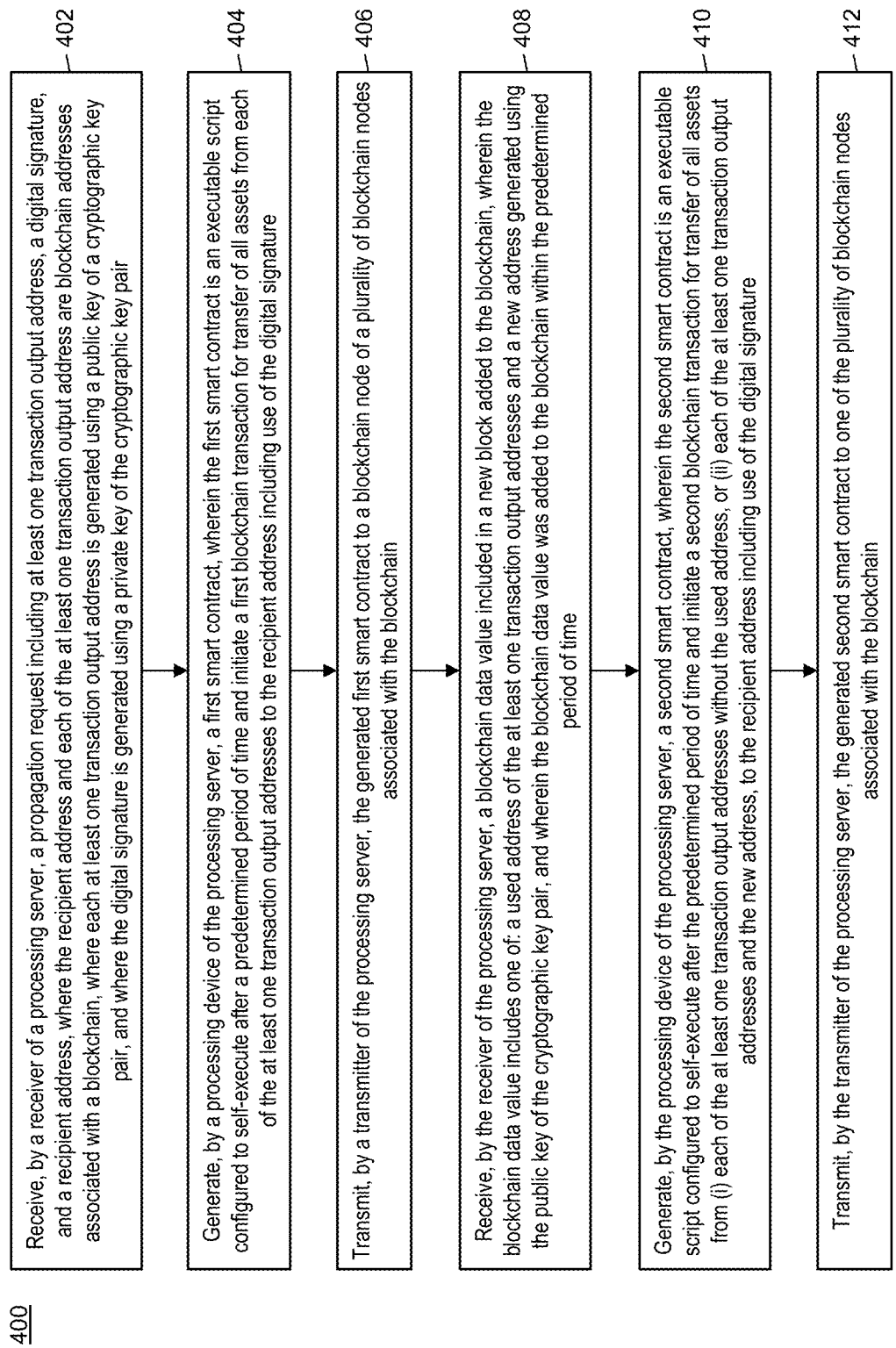
FIG. 4 is a flow chart illustrating an exemplary method for propagating survival of cryptographic currency after inactivity over a predetermined period of time in a blockchain through the use of smart contracts in accordance with exemplary embodiments.

FIG. 4 illustrates a method 400 for propagating the survival of cryptographic currency after inactivity over a predetermined period of time in a blockchain through the use of smart contracts.

In step 402, a propagation request may be received by a receiver (e.g., the receiving device 202) of a processing server (e.g., the processing server 102), wherein the propagation request includes at least one transaction output address, a digital signature, and a recipient address, where the recipient address and each of the at least one transaction output address are blockchain addresses associated with a blockchain, where each at least one transaction output address is generated using a public key of a cryptographic key pair, and where the digital signature is generated using a private key of the cryptographic key pair. In step 404, a first smart contract may be generated by a processing device (e.g., the generation module 220) of the processing server, wherein the first smart contract is an executable script configured to self-execute after a predetermined period of time and initiate a first blockchain transaction for transfer of all assets from each of the at least one transaction output addresses to the recipient address including use of the digital signature.

In step 406, the generated first smart contract may be transmitted by a transmitter (e.g., the transmitting device 224) of the processing server to a blockchain node of a plurality of blockchain nodes associated with the blockchain. In step 408, a blockchain data value included in a new block added to the blockchain may be received by the receiver of the processing server, wherein the blockchain data value includes one of: a used address of the at least one transaction output addresses and a new address generated using the public key of the cryptographic key pair, and wherein the blockchain data value was added to the blockchain within the predetermined period of time.

In step 410, a second smart contract may be generated by the processing device of the processing server, wherein the second smart contract is an executable script configured to self-execute after the predetermined period of time and initiate a second blockchain transaction for transfer of all assets from (i) each of the at least one transaction output addresses without the used address, or (ii) each of the at least one transaction output addresses and the new address, to the recipient address including use of the digital signature. In step 412, the generated smart contract may be transmitted by the transmitter of the processing server to one of the plurality of blockchain nodes associated with the blockchain.

In one embodiment, the recipient address may be generated using a separate public key of a second cryptographic key pair. In some embodiments, the processing server may be one of the plurality of blockchain nodes associated with the blockchain. In a further embodiment, the blockchain data value may be one of a plurality of blockchain data values included in a new block received from a separate blockchain node of the plurality of blockchain nodes associated with the blockchain. In one embodiment, the method 400 may further include validating, by the processing device (e.g., the validation module 222) of the processing server, the digital signature using the public key of the cryptographic key pair prior to generation of the first smart contract.

In some embodiments, the method 400 may also include: receiving, by the receiver of the processing server, a modification request, wherein the modification request includes a new destination address; generating, by the processing device of the processing server, a third smart contract, wherein the second smart contract is an executable script configured to self-execute after the predetermined period of time and initiate the second blockchain transaction to the new destination address in place of the recipient address; and transmitting, by the transmitter of the processing server, the generated third smart contract to one of the plurality of blockchain nodes associated with the blockchain. In a further embodiment, the modification request may further include a new digital signature, and the third smart contract may further include the new digital signature. In an even further embodiment, the method 400 may further include validating, by the processing device of the processing server, the new digital signature using the public key of the cryptographic key pair prior to generation of the third smart contract.

Computer System Architecture

Figure 5:
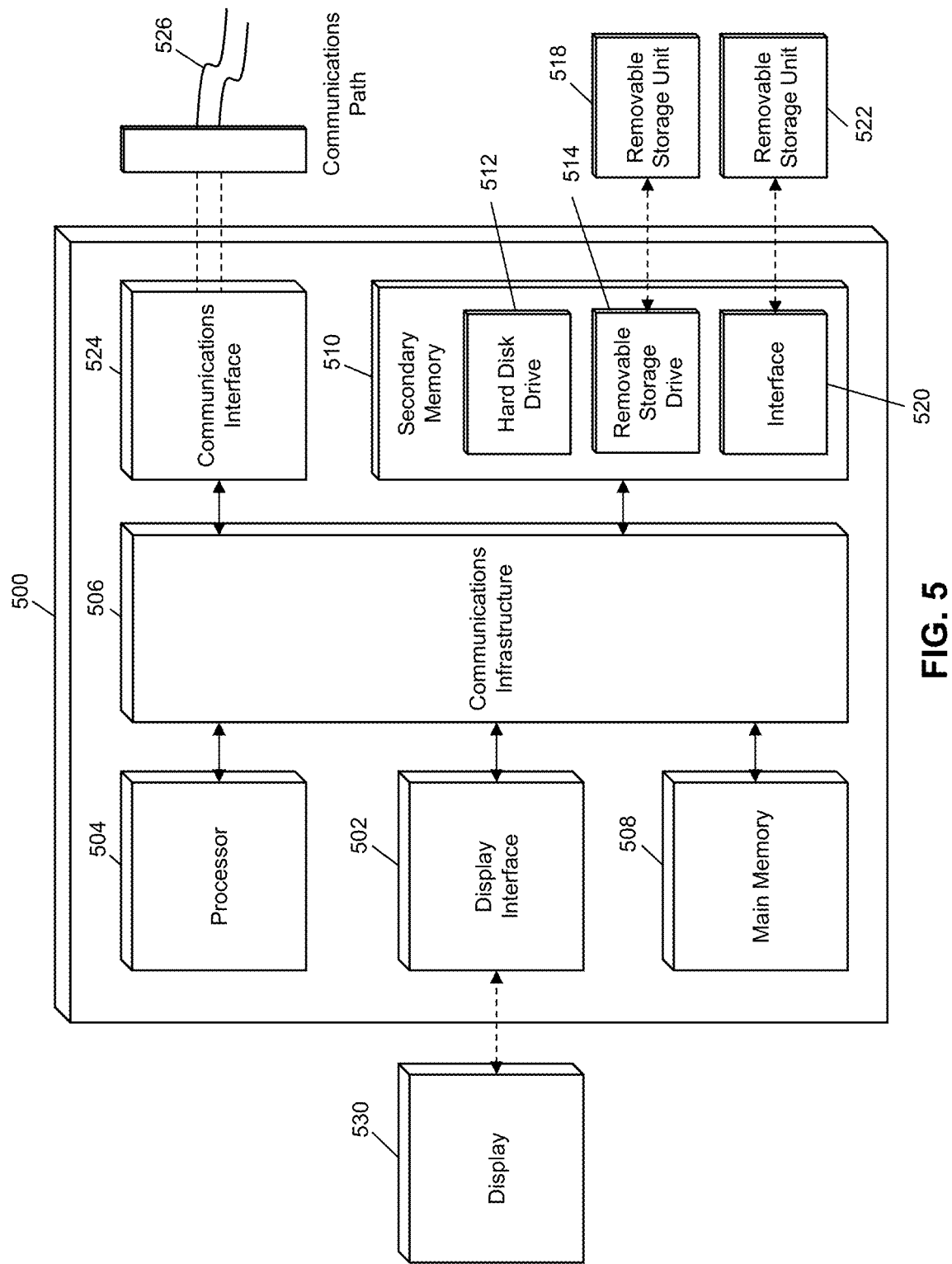
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for propagating survival of cryptographic currency after inactivity over a predetermined period of time in a blockchain through the use of smart contracts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for propagating survival of cryptographic currency after inactivity over a predetermined period of time in a blockchain through the use of smart contracts, comprising:
    receiving, by a receiver of a processing server, a propagation request including at least one transaction output address of a first blockchain wallet, a digital signature, and a recipient address associated with a second blockchain wallet, where the recipient address and each of the at least one transaction output address are blockchain addresses associated with a blockchain, where each at least one transaction output address is generated using a public key of a cryptographic key pair, and where the digital signature is generated using a private key of the cryptographic key pair;
    generating, by a processing device of the processing server, a first smart contract, wherein the first smart contract is an executable script (i) that self-executes after a predetermined period of time of inactivity associated with the at least one transaction output address of the first blockchain wallet, and (ii) initiates a first blockchain transaction for transfer of all assets from each of the at least one transaction output addresses of the first blockchain wallet to the recipient address of the second blockchain wallet including use of the digital signature;
    transmitting, by a transmitter of the processing server, the generated first smart contract to a blockchain node of a plurality of blockchain nodes associated with the blockchain;
    before expiration of the predetermined period of time of inactivity associated with the at least one transaction output address of the first blockchain wallet, receiving, by the receiver of the processing server, a blockchain data value included in a new block added to the blockchain indicating that a new transaction has been processed, wherein the blockchain data value includes one of: a used address of the at least one transaction output addresses of the first blockchain wallet and a new address generated using the public key of the cryptographic key pair, and wherein the blockchain data value was added to the blockchain within the predetermined period of time;

in response to receiving the blockchain data value included in the new block indicating that a new transaction has been processed, automatically generating, by the processing device of the processing server, a second smart contract, which causes expiration of the first smart contract, wherein the second smart contract is a second executable script that self-executes after the predetermined period of time of inactivity associated with the first blockchain wallet and initiate a second blockchain transaction for transfer of all assets from (i) each of the at least one transaction output addresses without the used address, or (ii) each of the at least one transaction output addresses and the new address, to the recipient address of the second blockchain wallet including use of the digital signature; and transmitting, by the transmitter of the processing server, the generated second smart contract to one of the plurality of blockchain nodes associated with the blockchain.

2. The method of claim 1, wherein the recipient address is generated using a separate public key of a second cryptographic key pair.

3. The method of claim 1, wherein the processing server is one of the plurality of blockchain nodes associated with the blockchain.

4. The method of claim 3, wherein the blockchain data value is one of a plurality of blockchain data values included in a new block received from a separate blockchain node of the plurality of blockchain nodes associated with the blockchain.

5. The method of claim 1, further comprising:
validating, by the processing device of the processing server, the digital signature using the public key of the cryptographic key pair prior to generation of the first smart contract.

6. The method of claim 1, further comprising:
receiving, by the receiver of the processing server, a modification request, wherein the modification request includes a new destination address;
generating, by the processing device of the processing server, a third smart contract, wherein the second smart contract is an executable script configured to self-execute after the predetermined period of time and initiate the second blockchain transaction to the new destination address in place of the recipient address; and
transmitting, by the transmitter of the processing server, the generated third smart contract to one of the plurality of blockchain nodes associated with the blockchain.

7. The method of claim 6, wherein
the modification request further includes a new digital signature, and
the third smart contract further includes the new digital signature.

8. The method of claim 7, further comprising:
validating, by the processing device of the processing server, the new digital signature using the public key of the cryptographic key pair prior to generation of the third smart contract.

9. A system for propagating survival of cryptographic currency after inactivity over a predetermined period of time in a blockchain through the use of smart contracts, comprising:

a receiver, of a processing server, configured to receive a propagation request including at least one transaction output address of a first blockchain wallet, a digital signature, and a recipient address of a second blockchain wallet, where the recipient address and each of the at least one transaction output address are blockchain addresses associated with a blockchain, where each at least one transaction output address is generated using a public key of a cryptographic key pair, and where the digital signature is generated using a private key of the cryptographic key pair;

a processing device, of the processing server, configured to generate a first smart contract, wherein the first smart contract is an executable script (i) that self-executes after a predetermined period of time of inactivity associated with the at least one transaction output address of the first blockchain wallet, and (ii) that initiates a first blockchain transaction for transfer of all assets from each of the at least one transaction output addresses of the first blockchain wallet to the recipient address of the second blockchain wallet including use of the digital signature; and a transmitter of the processing server configured to transmit the generated first smart contract to a blockchain node of a plurality of blockchain nodes associated with the blockchain, wherein the receiver, of the processing server, is further configured to receive, before expiration of the predetermined period of time of inactivity associated with the at least one transaction output address of the first blockchain wallet, a blockchain data value included in a new block added to the blockchain indicating that a new transaction has been processed, wherein the blockchain data value includes one of: a used address of the at least one transaction output addresses of the first blockchain wallet and a new address generated using the public key of the cryptographic key pair, and wherein the blockchain data value was added to the blockchain within the predetermined period of time, the processing device, of the processing server, is further configured to automatically generate, in response to the receipt of the blockchain data value included in the new block indicating that a new transaction has been processed, a second smart contract, which causes expiration of the first smart contract, wherein the second smart contract is a second executable script that self-executes after the predetermined period of time of inactivity associated with the first blockchain wallet and initiate a second blockchain transaction for transfer of all assets from (i) each of the at least one transaction output addresses without the used address, or (ii) each of the at least one transaction output addresses and the new address, to the recipient address of the second blockchain wallet including use of the digital signature, and the transmitter of the processing server is further configured to transmit the generated second smart contract to one of the plurality of blockchain nodes associated with the blockchain.

10. The system of claim 9, wherein the recipient address is generated using a separate public key of a second cryptographic key pair.

11. The system of claim 9, wherein the processing server is one of the plurality of blockchain nodes associated with the blockchain.

12. The system of claim 11, wherein the blockchain data value is one of a plurality of blockchain data values included in a new block received from a separate blockchain node of the plurality of blockchain nodes associated with the blockchain.

13. The system of claim 9, wherein the processing device of the processing server is further configured to validate the digital signature using the public key of the cryptographic key pair prior to generation of the first smart contract.

14. The system of claim 9, wherein
the receiver of the processing server is further configured to receive a modification request, wherein the modification request includes a new destination address,
the processing device of the processing server is further configured to generate a third smart contract, wherein the second smart contract is an executable script configured to self-execute after the predetermined period of time and initiate the second blockchain transaction to the new destination address in place of the recipient address, and
the transmitter of the processing server is further configured to transmit the generated third smart contract to one of the plurality of blockchain nodes associated with the blockchain.

15. The system of claim 14, wherein
the modification request further includes a new digital signature, and
the third smart contract further includes the new digital signature.

16. The system of claim 15, wherein the processing device of the processing server is further configured to validate the new digital signature using the public key of the cryptographic key pair prior to generation of the third smart contract.

* * * * *